US010538129B2

(12) United States Patent
Kunisawa

(10) Patent No.: US 10,538,129 B2
(45) Date of Patent: Jan. 21, 2020

(54) RUBBER COMPOSITION FOR BASE TREAD

(71) Applicant: SUMITOMO RUBBER INDUSTRIES, LTD., Kobe-shi, Hyogo (JP)

(72) Inventor: Tetsuya Kunisawa, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 34 days.

(21) Appl. No.: 15/695,760

(22) Filed: Sep. 5, 2017

(65) Prior Publication Data

US 2018/0093529 A1 Apr. 5, 2018

(30) Foreign Application Priority Data

Oct. 3, 2016 (JP) .................. 2016-195708

(51) Int. Cl.
B60C 1/00 (2006.01)
C08L 21/00 (2006.01)
B60C 11/00 (2006.01)
C08K 3/013 (2018.01)
C08L 7/00 (2006.01)
C08L 9/00 (2006.01)

(52) U.S. Cl.
CPC .......... B60C 1/0016 (2013.01); B60C 11/005 (2013.01); C08K 3/013 (2018.01); C08L 7/00 (2013.01); C08L 9/00 (2013.01); C08L 21/00 (2013.01); *B60C 2011/0025* (2013.01)

(58) Field of Classification Search
CPC ........... B60C 1/0016; B60C 2011/0025; B60C 2011/0016; C08L 21/00; C08L 7/00
See application file for complete search history.

(56) References Cited

U.S. PATENT DOCUMENTS

| 5,907,009 A * | 5/1999 | Muraoka | B60C 1/0016 |
| | | | 252/511 |
| 2006/0094815 A1 | 5/2006 | Kunisawa et al. | |
| 2008/0009570 A1 * | 1/2008 | Miyazaki | B60C 1/00 |
| | | | 524/89 |
| 2010/0132866 A1 * | 6/2010 | Imoto | C08K 7/06 |
| | | | 152/517 |
| 2010/0190907 A1 * | 7/2010 | Mizuno | C08L 7/00 |
| | | | 524/426 |
| 2010/0256258 A1 * | 10/2010 | Miyazaki | B60C 1/0016 |
| | | | 523/150 |
| 2011/0190440 A1 * | 8/2011 | Ohta | B60C 1/0008 |
| | | | 524/526 |
| 2014/0090764 A1 * | 4/2014 | Miyazaki | B60C 1/0025 |
| | | | 152/450 |
| 2014/0102611 A1 * | 4/2014 | Miyazaki | B60C 1/00 |
| | | | 152/450 |
| 2016/0152792 A1 * | 6/2016 | Kunisawa | B60C 1/0008 |
| | | | 524/493 |
| 2017/0267027 A1 * | 9/2017 | Kunisawa | B60C 11/00 |
| 2017/0305192 A1 * | 10/2017 | Yokoyama | B60B 9/26 |
| 2018/0244104 A1 * | 8/2018 | Kuwayama | B60C 11/03 |

FOREIGN PATENT DOCUMENTS

| JP | 6-329838 A | 11/1994 | |
| JP | 2001-240704 A | 9/2001 | |
| JP | 2004-137463 A | 5/2004 | |
| JP | 2006-124601 A | 5/2006 | |
| JP | 2008-101127 A | 5/2008 | |
| JP | 2009-7454 A | 1/2009 | |
| WO | WO-2014163478 A1 * | 10/2014 | ............... C08L 7/00 |

* cited by examiner

*Primary Examiner* — Liam J Heincer
(74) *Attorney, Agent, or Firm* — Birch, Stewart, Kolasch & Birch, LLP

(57) ABSTRACT

The purpose of the present invention is to provide a rubber composition for a base tread being excellent in fuel efficiency. In the rubber composition for a base tread, a dynamic elastic modulus E* (MPa) and a loss tangent tan δ which are measured at a temperature of 70° C., an initial strain of 10% and a dynamic strain of 2% satisfy the following general formulae (1) to (3), and a strength at break TB (MPa) and an elongation at break EB (%) which are measured according to JIS K6251 satisfy the following general formulae (4) and (5).

| $E^*/\tan \delta \geq 25$ | General formula (1) |
| $2.0 \leq E^* \leq 8.0$ | General formula (2) |
| $\tan \delta \leq 0.08$ | General formula (3) |
| $EB \geq 350$ | General formula (4) |
| $TB \times EB \geq 8500$ | General formula (5) |

9 Claims, No Drawings

RUBBER COMPOSITION FOR BASE TREAD

TECHNICAL FIELD

The present invention relates to a rubber composition for a base tread.

BACKGROUND ART

Recently a demand for fuel efficiency of a tire has been increasing more and more, and more excellent fuel efficiency is required not only for a cap tread occupying a large portion of a tire but also for other tire components such as a base tread, a side wall and a clinch.

JP 2008-101127 A and JP 2009-007454 A describe rubber compositions for a tread in which reduction of rolling resistance and enhancement of braking performance and abrasion resistance were successfully achieved. However, application to tire components other than a cap tread is not referred to.

SUMMARY OF THE INVENTION

An object of the present invention is to provide a rubber composition for a base tread assuring excellent fuel efficiency.

The present invention relates to a rubber composition for a base tread, wherein a dynamic elastic modulus $E^*$ (MPa) and a loss tangent tan $\delta$ which are measured at a temperature of 70° C., an initial strain of 10% and a dynamic strain of 2% satisfy the following general formulae (1) to (3), and a strength at break TB (MPa) and an elongation at break EB (%) which are measured according to JIS K6251 satisfy the following general formulae (4) and (5).

$E^*/\tan \delta \geq 25$      General formula (1)

$2.0 \leq E^* \leq 8.0$      General formula (2)

$\tan \delta \leq 0.08$      General formula (3)

$EB \geq 350$      General formula (4)

$TB \times EB \geq 8500$      General formula (5)

It is preferable that a rubber hardness Hs of the rubber composition measured at 23° C. in accordance with JIS K6253 Type A Method is not more than 62.

It is preferable that the rubber composition comprises m kinds (m is an integer of 1 or more) of carbon black and/or n kinds (n is an integer of 1 or more) of silica.

It is preferable that a content and a nitrogen adsorption specific surface area of carbon black, and a content and a BET specific surface area of silica satisfy the following general formulae (6) and (7).

$15 \leq (W1+W2+\ldots+Wm)+(Y1+Y2+\ldots+Yn) \leq 65$      General formula (6)

$0.20 \leq (W1/X1+W2/X2+\ldots+Wm/Xm)+(Y1/Z1+Y2/Z2+\ldots+Yn/Zn) \leq 1.2$      General formula (7)

(In the general formulae, W1, W2 Wm represent contents (part by mass) of the respective carbon black based on 100 parts by mass of rubber component, X1, X2 Xm represent nitrogen adsorption specific surface areas ($m^2/g$) of the respective carbon black, Y1, Y2 Yn represent contents (part by mass) of the respective silica based on 100 parts by mass of rubber component, and Z1, Z2 Zn represent BET specific surface areas ($m^2/g$) of the respective silica.

The rubber composition for a base tread of the present invention, wherein a dynamic elastic modulus $E^*$ (MPa) and a loss tangent tan $\delta$ which are measured at a temperature of 70° C., an initial strain of 10% and a dynamic strain of 2% satisfy the following general formulae (1) to (3), and a strength at break TB (MPa) and an elongation at break EB (%) which are measured according to JIS K6251 satisfy the following general formulae (4) and (5), assures excellent fuel efficiency.

$E^*/\tan \delta \geq 25$      General formula (1)

$2.0 \leq E^* \leq 8.0$      General formula (2)

$\tan \delta \leq 0.08$      General formula (3)

$EB \geq 350$      General formula (4)

$TB \times EB \geq 8500$      General formula (5)

DESCRIPTION OF EMBODIMENTS

The rubber composition for a base tread of the present disclosure is characterized in that the dynamic elastic modulus $E^*$ (MPa) and the loss tangent tan $\delta$ which are measured at a temperature of 70° C., an initial strain of 10% and a dynamic strain of 2% and the strength at break TB (MPa) and the elongation at break EB (%) which are measured according to JIS K6251 satisfy the specific general formulae.

The dynamic elastic modulus $E^*$ (MPa) and the loss tangent tan $\delta$ which are measured at a temperature of 70° C., an initial strain of 10% and a dynamic strain of 2% satisfy the following general formulae (1) to (3).

$E^*/\tan \delta \geq 25$      General formula (1)

$2.0 \leq E^* \leq 8.0$      General formula (2)

$\tan \delta \leq 0.08$      General formula (3)

A base tread becomes various working temperatures of from 0° C. or lower up to around 100° C. depending on external environment and a running time. Meanwhile, in many cases, a temperature of a base tread during running generally is around 70° C. Therefore, when the dynamic elastic modulus $E^*$ (MPa) and the loss tangent tan $\delta$ which are measured at a temperature of 70° C., an initial strain of 10% and a dynamic strain of 2% satisfy the above-mentioned general formulae (1) to (3), both a rubber physical property of good trackability to the other components of tire and improved fuel efficiency can be achieved.

Herein, $E^*$ is a dynamic elastic modulus at elongation which is measured at a temperature of 70° C., an initial strain of 10% and a dynamic strain of 2% with a viscoelasticity spectrometer. The dynamic elastic modulus $E^*$ exhibits a stress against a strain applied periodically. Therefore, as a value of $E^*$ becomes larger, a physical property of a rubber (rubber elasticity) is excellent, a trackability to the other components of tire is good and steering stability is excellent. Further, tan $\delta$ herein is a loss tangent at elongation measured with a viscoelasticity spectrometer under the conditions of a temperature of 70° C., an initial strain of 10% and a dynamic strain of 2%. The loss tangent tan $\delta$ is a size of energy consumed during a process of giving a strain, and this consumed energy changes to heat. Namely, the smaller a value of tan $\delta$ is, the more excellent heat build-up characteristic and fuel efficiency are. Therefore, as a value of $E^*/\tan \delta$ in the general formula (1) becomes larger, it indicates that both a rubber physical property and improved fuel efficiency can be achieved.

The value of E*/tan δ in the general formula (1) is not less than 25, preferably not less than 30. When the value of E*/tan δ satisfies the general formula (1), excellent rubber physical property and improved fuel efficiency can be achieved.

The E* in the general formula (2) is not less than 2.0 MPa, preferably not less than 2.5 MPa. On the other hand, the E* is not more than 8.0 MPa, preferably not more than 7.5 MPa. When the E* is within a range mentioned above, a uniform rubber composition having good processability can be obtained. As a result, a balance of physical properties between the base tread and the other components adjacent thereto becomes satisfactory and the base tread has good following property with other tire components, leading to good steering stability.

The tan δ in the general formula (3) is not more than 0.080, preferably not more than 0.075, more preferably not more than 0.070. A lower limit of the tan δ is not limited particularly. When the tan δ is within a range mentioned above, excellent fuel efficiency can be obtained.

As mentioned above, in the rubber composition for a base tread of the present disclosure, when the general formulae (1) to (3) are satisfied, both a rubber physical property of good following property toward the other components of tire and improved fuel efficiency can be achieved.

Further, in the rubber composition for a base tread of the present disclosure, when the elongation at break EB (%) and the strength at break TB (MPa) which are measured according to JIS K6251 satisfy the following general formulae (4) and (5), a rubber composition having excellent durability can be obtained.

$$EB \geq 350 \quad \text{General formula (4)}$$

$$TB \times EB \geq 8500 \quad \text{General formula (5)}$$

Herein, the EB is the elongation at break measured according to JIS K6251. The elongation at break EB indicates a rate (%) of elongation at which breakage of a stretched sample arises. The larger the EB value, the more satisfactory fatigue resistance is.

The EB is not less than 350% satisfying the general formula (4), preferably not less than 375%, more preferably not less than 400%. When the EB is less than 350%, sufficient fatigue resistance tends not to be obtained. An upper limit of the EB is not limited particularly.

Herein, the TB is the strength at break measured according to JIS K6251. The strength at break TB indicates a force (MPa) necessary for breaking a stretched sample. The larger the TB value is, the more satisfactory the strength at break is.

The TB×EB is not less than 8,500 satisfying the general formula (5), preferably not less than 9,000, more preferably not less than 10,000. When the TB×EB is less than 8,500, there is a tendency that sufficient fracture resistance cannot be obtained. An upper limit of the TB×EB is not limited particularly.

As mentioned above, the rubber composition for a base tread of the present disclosure satisfies the general formulae (4) and (5), and therefore, is excellent in durability (fatigue resistance, fracture resistance).

A rubber hardness Hs of the rubber composition for a base tread of the present disclosure is preferably not less than 40, more preferably not less than 45, from the viewpoint of processability and steering stability. On the other hand, the Hs is preferably not more than 62, more preferably not more than 60, from the viewpoint of resistance to cracking from flexing and fatigue resistance. It is noted that herein, the rubber hardness Hs of the rubber composition is a JIS-A hardness which is a value measured under an environment of 23° C. in accordance with JIS K6253.

It is preferable that the rubber composition for a base tread of the present disclosure comprises a rubber component and additives.

Rubber components which are generally used in the tire industry can be used as the above-mentioned rubber component, and examples thereof include diene rubbers such as natural rubber (NR), modified natural rubber, isoprene rubber (IR), butadiene rubber (BR) and styrene-butadiene rubber (SBR). These rubber components may be used alone or may be used in combination of two or more thereof. Among these, NR and BR are preferred for the reason that fuel efficiency and durability are excellent.

The above-mentioned NR includes high purity natural rubber (HPNR), and examples of the modified natural rubber include epoxidized natural rubber (ENR), hydrogenated natural rubber (HNR), grafted natural rubber, and the like. Further NRs such as SIR20, RSS #3 and TSR20 which are generally used in the tire industry and HPNR are used as the NR.

Examples of the method of preparing the above-mentioned HPNR include a method of agglomerating, cleaning and drying a natural rubber latex subjected to deproteinization, saponification, acid treatment or the like and the like method.

A nitrogen content of HPNR is preferably not more than 0.20% by mass, more preferably not more than 0.15% by mass, from the viewpoint of fuel efficiency and durability. On the other hand, it is preferable that a lower limit of the nitrogen content of HPNR is as low as possible, and it is desirable that HPNR does not include nitrogen if possible. The lower limit is usually 0.03% by mass because of limitation in the preparation method. A nitrogen content of natural rubber is measured by Kjeldahl method.

When the rubber component comprises NR, a content thereof in the rubber component is preferably not less than 40% by mass, more preferably not less than 50% by mass, from a point that sufficient fracture resistance is obtained. On the other hand, the NR content is preferably 100% by mass from a point that a petroleum-derived component is not used. In the case of using two or more of NRs, the NR content is the total amount thereof.

The BR is not limited particularly, and examples thereof include BRs having a high-cis content of not less than 90% by mass such as BR730 and BR51 available from JSR Corporation, BR1220 available from ZEON CORPORATION and UBEPOL BR130B, BR150B and BR710 available from Ube Industries, Ltd.; BRs having a low-cis content of less than 90% by mass such as BR1250H available from ZEON CORPORATION; BR (SPB-containing BR) having 1,2-syndiotactic polybutadiene crystal (SPB) such as VCR412 and VCR617 available from Ube Industries, Ltd.; and the like. These BRs may be used alone or may be used in combination of two or more thereof. Among these, it is preferable to use BRs having a low-cis content, for the reason that good fuel efficiency is obtained.

When the rubber component comprises BR, a content thereof in the rubber component is preferably not less than 10% by mass, more preferably not less than 20% by mass, from the viewpoint of fuel efficiency. On the other hand, the BR content is preferably not more than 70% by mass, more preferably not more than 60% by mass, from the viewpoint of fracture resistance. In the case of using two or more of BRs, the BR content is the total amount thereof.

Examples of the additives include those which are used generally in the tire industry, for example, a reinforcing filler such as carbon black and silica, a coupling agent, a weak reinforcing filler, zinc oxide, stearic acid, an anti-aging agent a plasticizer, wax, an antistatic agent, a vulcanizing agent such as sulfur, and a vulcanization accelerator. These can be compounded appropriately.

From the viewpoint that a rubber strength and fuel efficiency can consist together, it is preferable that the rubber composition for a base tread of the present disclosure comprises m kinds of carbon black (m is an integer of 1 or more) and/or n kinds of silica (n is an integer of 1 or more), and it is more preferable that the rubber composition for a base tread of the present disclosure comprises m kinds of carbon black and n kinds of silica.

It is preferable that the rubber composition comprises carbon black from the viewpoint of prevention of static charge and reinforceability. Examples of usable carbon black include those which are generally used in the tire industry such as GPF, HAF, ISAF and SAF.

A nitrogen adsorption specific surface area ($N_2SA$) of carbon black is preferably not less than 25 $m^2/g$, preferably not less than 30 $m^2/g$ for the reason that a sufficient reinforcing effect can be obtained. On the other hand, the $N_2SA$ of carbon black is preferably not more than 170 $m^2/g$, more preferably not more than 150 $m^2/g$, further preferably not more than 140 $m^2/g$, further preferably not more than 130 $m^2/g$, most preferably not more than 120 $m^2/g$, from the viewpoint of fuel efficiency. Herein, the $N_2SA$ of carbon black is a value measured according to JIS K 6217, Method A.

It is preferable that the rubber composition comprises silica, from the viewpoint of reinforceability and fuel efficiency. Examples of usable silica include silica prepared by a dry method (anhydrous silica), silica prepared by a wet method (hydrous silica), and the like. Hydrous silica prepared by a wet method is preferred for the reason that the hydrous silica has many silanol groups on its surface and many reaction points reacting with the silane coupling agent.

A BET specific surface area of silica is preferably not less than 50 $m^2/g$, more preferably not less than 60 $m^2/g$, for the reason that a sufficient reinforcing effect of silica can be obtained. On the other hand, the BET specific surface area of silica is preferably not more than 350 $m^2/g$, more preferably not more than 340 $m^2/g$, for the reason that fuel efficiency is excellent. Herein, the BET specific surface area of silica is a value measured by a BET method according to ASTM D3037-81, Method A.

When the rubber composition comprises m kinds of carbon black (m is an integer of 1 or more) and n kinds of silica (n is an integer of 1 or more), it is preferable that the content and nitrogen adsorption specific surface area of carbon black, and the content and BET specific surface area of silica satisfy the following general formulae (6) and (7), since both excellent fuel efficiency and fracture resistance can be achieved.

$$15 \leq (W1+W2+ +Wm)+(Y1+Y2+ +Yn) \leq 65 \quad \text{General formula (6)}$$

$$0.20 \leq (W1/X1+W2/X2+ +Wm/Xm)+(Y1/Z1+ Y2/Z2+ +Yn/Zn) \leq 1.2 \quad \text{General formula (7)}$$

In the general formulae, W1, W2 Wm represent contents (part by mass) of the respective carbon black based on 100 parts by mass of rubber component, X1, X2 Xm represent nitrogen adsorption specific surface areas ($m^2/g$) of the respective carbon black, Y1, Y2 Yn represent contents (part by mass) of the respective silica based on 100 parts by mass of rubber component, and Z1, Z2 Zn represent BET specific surface areas ($m^2/g$) of the respective silica.

In the general formula (6), W1+W2+ +Wm represents a sum of each content (part by mass) of m kinds of carbon black based on 100 parts by mass of rubber component, and Y1+Y2+ +Yn represents a sum of each content (part by mass) of n kinds of silica based on 100 parts by mass of rubber component. The total content of carbon black and silica based on 100 parts by mass of rubber component is preferably not less than 15 parts by mass, more preferably not less than 20 parts by mass, further preferably not less than 25 parts by mass. On the other hand, the total content of carbon black and silica is preferably not more than 65 parts by mass. When the total content of carbon black and silica is within the range mentioned above, namely when the general formula (6) is satisfied, both an improved rubber strength and fuel efficiency can be achieved.

In the general formula (7), W1/X1+W2/X2+ +Wm/Xm represents a sum of each "content based on 100 parts by mass of rubber component/$N_2SA$" of m kinds of carbon black, and Y1/Z1+Y2/Z2+ +Yn/Zn represents a sum of each "content based on 100 parts by mass of rubber component/ BET specific surface area" of n kinds of silica. A sum of "the content of each carbon black based on 100 parts by mass of rubber component/$N_2SA$" and "the content of each silica based on 100 parts by mass of rubber component/BET specific surface area" is preferably not less than 0.20, more preferably not less than 0.25, further preferably not less than 0.30. On the other hand, the sum is preferably not more than 1.2, more preferably not more than 0.8, further preferably not more than 0.4. When the sum is within the range mentioned above, namely when the general formula (7) is satisfied, both fuel efficiency and fracture resistance can be improved in good balance.

Examples of the above-mentioned coupling agent include silane coupling agents, and when the rubber composition comprises silica, it is preferable to use a silane coupling agent together with silica. Any of silane coupling agents which have been used in combination with silica can be used. Examples thereof include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-triethoxysilylpropyl methacrylate monosulfide and 3-trimethoxysilylpropyl methacrylate monosulfide; mercapto silane coupling agents such as 3-mercaptopropyltrimethoxysilane, 3-mercaptopropyltriethoxysilane, 2-mercaptoethyltrimethoxysilane, 2-mercaptoethyltriethoxysilane and 3-octanoylthio-1-propyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro silane coupling agents such as 3-nitropropyltrimethoxysilane and 3-nitropropyltriethoxysilane; and chloro silane coupling agents such as 3-chloropropyltrimethoxysilane, 3-chloropropyltriethoxysilane, 2-chloroethyltrimethoxysilane and 2-chloroethyltriethoxysilane, and the like. There are, as tradenames, Si69, Si266 and Si363 (available from Evonik Degussa GmbH), NXT, NXT-LV, NXTULV and NXT-Z (available from Momentive Performance Materials), and the like. These coupling agents can be used alone, or can be used in combination of two or more thereof.

When the rubber composition comprises the silane coupling agent, the content thereof based on 100 parts by mass of silica is preferably not less than 0.5 part by mass, more preferably not less than 1.5 parts by mass, further preferably not less than 2.5 parts by mass, for the reason that silica can be dispersed satisfactorily. On the other hand, the content of the silane coupling agent is preferably not more than 20 parts by mass, more preferably not more than 15 parts by mass, further preferably not more than 10 parts by mass, for the reason that an effect of dispersing silica corresponding to increase in cost is obtained and that processability in a kneading step and an extrusion step is satisfactory because a scorching time does not become too short.

The rubber composition for a base tread of the present disclosure can comprise a weak reinforcing filler as a bulking agent. Examples of the weak reinforcing filler include pulverized bituminous coal, talc, mica, hard clay, calcium carbonate and the like, and these may be used alone or may be used in combination of two or more thereof. These weak reinforcing fillers do not form a polymer gel during a kneading step, and therefore, by compounding these fillers, good processability of a rubber sheet is obtained. Among these, pulverized bituminous coal, talc and hard clay are preferable from the viewpoint of rubber sheet processability and cost, and calcium carbonate is preferable from the viewpoint of less influence on other performances.

An average particle size of talc is preferably not more than 50 μm, more preferably not more than 30 μm, from the viewpoint of improved fuel efficiency. On the other hand, a lower limit of the average particle size of talc is not limited particularly and is preferably not less than 1 μm.

An average particle size of mica is preferably not more than 50 μm, more preferably not more than 30 μm, from the viewpoint of improved fuel efficiency. On the other hand, a lower limit of the average particle size of mica is not limited particularly and is preferably not less than 1 μm.

An average particle size of hard clay is preferably not more than 50 μm, more preferably not more than 30 μm, from the viewpoint of improved fuel efficiency. On the other hand, a lower limit of the average particle size of hard clay is not limited particularly and is preferably not less than 1 μm.

An average particle size of calcium carbonate is preferably not more than 300 nm, more preferably not more than 100 nm, from the viewpoint of fuel efficiency and a degree of influence on other performances. On the other hand, a lower limit of the average particle size of calcium carbonate is not limited particularly and is preferably not less than 30 nm.

Herein, an average particle size of the weak reinforcing filler is an average particle size based on a mass calculated from a particle size distribution determined according to JIS Z8815-1994.

When the rubber composition comprises the weak reinforcing filler, a content thereof based on 100 parts by mass of rubber component (a sum of contents in the case of combination use of fillers) is preferably not less than 3 parts by mass, more preferably not less than 8 parts by mass, from the viewpoint of processability of a rubber sheet. On the other hand, the content of the weak reinforcing filler is preferably not more than 45 parts by mass, more preferably not more than 40 parts by mass, for the reason that sufficient elongation at break is obtained.

Oil, a liquid polymer, a liquid resin, vegetable oil, an ester plasticizer and the like can be used as the plasticizer, and among these, oil is preferable from the viewpoint of a balance between processability, fuel efficiency and cost. Oil generally used in the tire industry such as aromatic oil, naphthenic oil and paraffinic oil can be used as the oil. Examples of the ester plasticizer include dibutyl adipate (DBA), diisobutyl adipate (DIBA), dioctyl adipate (DOA), di(2-ethylhexyl) azelate (DOZ), dibutyl sebacate (DBS), diisononyl adipate (DINA), diethyl phthalate (DEP), dioctyl phthalate (DOP), diundecyl phthalate (DUP), dibutyl phthalate (DBP), di(2-ethylhexyl) sebacate (DOS), tributyl phosphate (TBP), trioctyl phosphate (TOP), triethyl phosphate (TEP), trimethyl phosphate (TMP), thymidine triphosphate (TTP), tricresyl phosphate (TCP), trixylenyl phosphate (TXP), and the like.

When the rubber composition comprises the plasticizer, a content thereof based on 100 parts by mass of the rubber component is preferably not less than 3 parts by mass, more preferably not less than 4 parts by mass, for the reason that both improved fuel efficiency and good processability are achieved. On the other hand, the content of plasticizer is preferably not more than 40 parts by mass, more preferably not more than 35 parts by mass, for the reason of inhibiting decrease in a rubber strength.

Examples of the antistatic agent include a compound having an oxyethylene unit such as polyethylene glycol ester or polyoxyethylene alkyl ether, an ionic liquid and the like, and an ionic liquid is preferable from the viewpoint of an effect of preventing static charging and durability of the rubber composition.

Examples of the ionic liquid include ionic liquids represented by the following chemical formulae (I)-(IV).

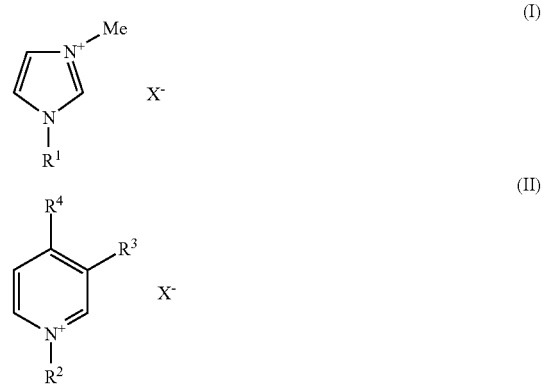

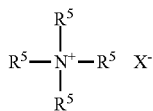

(III)

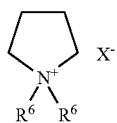

(IV)

(in the chemical formulae, each of $R^1$, $R^2$, $R^5$ and $R^6$ is independently an alkyl group having 1 to 8 carbon atoms, each of $R^3$ and $R^4$ is independently hydrogen or an alkyl group having 1 to 8 carbon atoms, X is independently Br, Cl, $NO_3$, $PF_6$, $BF_4$, tosyl, $CF_3SO_3$, $(CF_3SO_2)_2N$, $(C_2F_5SO_2)_2N$, $CH_3O(C_2H_4O)_2SO_3$, $CH_3OSO_3$ or $C_8H_{17}SO_3$)

The ionic liquid represented by the chemical formula (I) is an imidazolium ionic liquid, the ionic liquid represented by the chemical formula (II) is a pyridinium ionic liquid, the ionic liquid represented by the chemical formula (III) is an ammonium ionic liquid, and the ionic liquid represented by the chemical formula (IV) is a pyrrolidinium ionic liquid.

In the chemical formulae (I)-(IV), each of $R^1$, $R^2$, $R^5$ and $R^6$ is independently an alkyl group having 1 to 8 carbon atoms, each of $R^3$ and $R^4$ is independently hydrogen or an alkyl group having 1 to 8 carbon atoms, and X is independently Br, Cl, $NO_3$, $PF_6$, $BF_4$, tosyl, $CF_3SO_3$, $(CF_3SO_2)_2N$, $(C_2F_5SO_2)_2N$, $CH_3O(C_2H_4O)_2SO_3$, $CH_3OSO_3$ or $C_8H_{17}SO_3$.

Examples of the alkyl groups having 1 to 8 carbon atoms include methyl, ethyl, propyl, butyl, hexyl, octyl, and the like.

<Imidazolium Ionic Liquid>

Herein, among the ionic liquids of the chemical formula (I), particularly preferred are ionic liquids having a specific combination of {$R^1$/X} which is either of {methyl/$CH_3SO_4$}, {ethyl/Br, Cl, $NO_3$, $PF_6$, $BF_4$, tosyl, $CF_3SO_3$, $(CF_3SO_2)_2N$, or $(C_2F_5SO_2)_2N$}, {butyl/Br, Cl, $PF_6$, $BF_4$, $(CF_3SO_2)_2N$, $CH_3O(C_2H_4O)_2SO_3$, $CH_3OSO_3$, or $C_8H_{17}SO_3$}, {hexyl/Cl, $PF_6$, or $BF_4$} or {octyl/Cl, or $BF_4$}.

<Pyridinium Ionic Liquid>

Among the ionic liquids of the chemical formula (II), particularly preferred are ionic liquids having a specific combination of {$R^2$/$R^3$/$R^4$/X} which is either of {ethyl/methyl/H/$(CF_3SO_2)_2N$}, {propyl or butyl/methyl/H/$(CF_3SO_2)_2N$} or {butyl/H/methyl/Br, Cl, $PF_6$ or $BF_4$}.

<Ammonium Ionic Liquid>

Among the ionic liquids of the chemical formula (III), particularly preferred is an ionic liquid, in which three $R^5$s are methyl ($CH_3$), one $R^5$ is propyl ($C_3H_8$) and X is $(CF_3SO_2)_2N$.

In the rubber composition for a tire according to one embodiment of the present disclosure, an effect of inhibiting static charging can be obtained more effectively by using at least one of the ionic liquids represented by the chemical formulae (I) to (IV) as the antistatic agent. Further, among the ionic liquids represented by the chemical formulae (I) to (IV), the ionic liquids having an adequate combination of $R^1$ to $R^6$ and X as mentioned above are further excellent in an effect of inhibiting static charging.

When the rubber composition comprises the antistatic agent, a content thereof is preferably not less than 5 parts by mass, more preferably not less than 10 parts by mass, from a point of an effect of inhibiting static charging and from the viewpoint of processability. On the other hand, the content thereof is preferably not more than 35 parts by mass, more preferably not more than 30 parts by mass, for the reason that from the viewpoint of inhibiting reduction of rigidity of a rubber, resulting in lowering of steering stability.

Examples of the vulcanization accelerator include benzothiazoles, benzothiazolylsulfenamides, benzothiazolylsulfenimides, and the like. Among these, benzothiazolylsulfenamides are preferable, and N-cyclohexyl-2-benzothiazolylsulfenamide is more preferable for the reason that these are suitable for NR and BR and are comparatively inexpensive, and a vulcanization speed is fast. Further, benzothiazolylsulfenamides may be used in combination with other vulcanization accelerators.

When the rubber composition comprises the vulcanization accelerator, a content thereof based on 100 parts by mass of the rubber component is preferably not less than 0.5 part by mass, more preferably not less than 1.0 part by mass, for the reason that a proper vulcanization speed is obtained and the vulcanization is performed sufficiently. On the other hand, the content of the vulcanization accelerator is preferably not more than 4.0 parts by mass, more preferably not more than 3.0 parts by mass, for the reason that a proper vulcanization speed is obtained and scorching is hard to arise.

A method of preparing the rubber composition for a base tread of the present disclosure is not limited particularly, and well-known methods can be used. For example, the rubber composition can be prepared by a method of kneading each of the above-mentioned components using a rubber kneading apparatus such as an open roll, a Banbury mixer, an enclosed kneader, or the like and then conducting vulcanization, or the like method.

The rubber composition for a base tread of the present disclosure assures excellent durability and fuel efficiency, and therefore, is used preferably on a tire having a base tread produced using the rubber composition.

A tire using the rubber composition for a base tread of the present disclosure can be produced by usual methods. Namely, the tire can be produced by subjecting an unvulcanized rubber composition prepared by compounding the above-mentioned additives with the diene rubber component according to necessity, to extrusion processing to a shape of a base tread or the like, and then forming together with other tire components on a tire building machine by a usual forming method, thus forming an unvulcanized tire, and heating and compressing this unvulcanized tire in a vulcanizer.

EXAMPLE

The present disclosure will be described based on Examples, but the present disclosure is not limited thereto only.

First of all, variety of chemicals used in the following Preparation Examples will be collectively shown below. The chemicals were subjected to refining by a usual method if necessary.

Natural rubber latex: Field latex obtained from Thaitex
Surfactant: Emal-E produced by Kao Corporation
Sodium hydroxide: NaOH produced by Wako Pure Chemical Industries, Ltd.
Formic acid: Formic acid produced by Kanto Kagaku Kabushiki Kaisha <Preparation Example of HPNR 1>

After a solid content (DRC) of the natural rubber latex had been adjusted to 30% (w/v), 10 g of a surfactant and 20 g of sodium hydroxide were added to 1,000 g of the natural rubber latex, followed by 48-hour saponification reaction at room temperature to obtain a saponified natural rubber latex. After dilution of this latex by adding water until DRC reached 15% (w/v), while stirring the latex slowly, formic acid was added to the latex to adjust a pH value to 4.0-4.5 and agglomerate the latex. The agglomerated rubber was pulverized, and washing with 1,000 ml of water was repeated, followed by 2-hour drying at 110° C. to obtain a solid rubber (HPNR 1).

<Preparation Example of HPNR 2>

After a solid content (DRC) of the natural rubber latex had been adjusted to 30% (w/v), this latex was diluted by adding water until DRC reached 15% (w/v). Thereafter, while stirring the latex slowly, formic acid was added to the latex to adjust a pH value to 4.0-4.5 and agglomerate the latex. The agglomerated rubber was pulverized, and washing with 1,000 ml of water was repeated, followed by 2-hour drying at 110° C. to obtain a solid rubber (HPNR 2).

Next, a variety of chemicals used in Examples and Comparative examples will be collectively explained below.

NR: TSR20
HPNR 1: High purity natural rubber prepared in the above Preparation example of HPNR 1 (nitrogen content: 0.06% by mass)
HPNR 2: High purity natural rubber prepared in the above Preparation example of HPNR 2 (no saponification reaction, nitrogen content: not less than 0.1% by mass)
BR 1: UBEPOL BR 150B (cis content: 97% by mass) available from Ube Industries, Ltd.
BR 2: BR1250H available from ZEON CORPORATION (polymerized using lithium as an initiator, an amount of vinyl bond: 10 to 13% by mass, Mw/Mn: 1.5, content of tin atom: 250 ppm, cis content: 35% by mass, tin terminal-modified BR)
Carbon black 1: DIABLACK N339 available from Mitsubishi Chemical Corporation ($N_2SA$: 96 $m^2/g$)
Carbon black 2: DIABLACK E available from Mitsubishi Chemical Corporation (FEF, N550, $N_2SA$: 41 $m^2/g$)
Silica: ULTRASIL VN3 available from Evonik Degussa GmbH ($N_2SA$: 175 $m^2/g$)
Silane coupling agent: Si266 available from Evonik Degussa GmbH (bis(3-triethoxysilylpropyl)disulfide)
Oil: X-140 (aromatic oil) available from JX Nippon Oil & Energy Corporation
Antistatic agent: N, N, N-trimethyl-N-propylammonium bis (trifluoromethanesulfonyl)imide (in the chemical formula (III), $R^5$: three are methyl groups ($CH_3$) and one is a propyl group ($C_3H_8$), X: bis(trifluoromethanesulfonyl)imide (($CF_3SO_2$)$_2$N))
Wax: SUNNOC N available from OUCHI SHINKO CHEMICAL INDUSTRIAL CO., LTD.
Anti-aging agent: Antigen 3C (N-isopropyl-N'-phenyl-p-phenylenediamine) available from Sumitomo Chemical Company, Limited
Stearic acid: Stearic acid "Tsubaki" available from NOF CORPORATION Zinc oxide: ZINC FLOWER No. 1 available from Mitsui Mining & Smelting Co., Ltd.
Sulfur: Powdered sulfur available from Tsurumi Chemical Industry Co., Ltd.
Vulcanization accelerator: SOXINOL CZ (N-cyclohexyl-2-benzothiazolylsulfenamide) available from Sumitomo Chemical Company, Limited Examples 1 to 4 and Comparative Examples 1 to 3

According to compounding formulation shown in Table 1, chemicals other than sulfur and vulcanization accelerator were kneaded using a 1.7 liter Banbury mixer at a discharge temperature of 150° C. for five minutes to obtain a kneaded product. Next, sulfur and vulcanization accelerator were added to the obtained kneaded product in an open roll, followed by 3-minute kneading to obtain an unvulcanized rubber composition. Further, the obtained unvulcanized rubber composition was subjected to press-vulcanization at 150° C. for 30 minutes to obtain a vulcanized rubber sheet for test.

Further, each of the obtained unvulcanized rubber compositions was subjected to forming to be in a shape of a base tread, laminating together with other tire components on a tire building machine, and press-vulcanization at 150° C. for 30 minutes to obtain a test tire (tire size: 195/65R15).

The obtained vulcanized rubber sheets for test and test tires were evaluated by the methods described below. The evaluation results are shown in Table 1.

<Viscoelasticity Test>

A dynamic elastic modulus E* and a loss tangent tan δ of each of the vulcanized rubber sheets for test were measured under the conditions of a temperature of 70° C., a frequency of 10 Hz, an initial strain of 10% and a dynamic strain of 2%, using a viscoelasticity spectrometer VES manufactured by Iwamoto Seisakusyo K. K. Values of E*/tan δ in the general formulae (1) were calculated from the obtained measured values.

<Tensile Test>

Tensile test was carried out in accordance with JIS K 6251, "Rubber, vulcanized or thermoplastic—Determination of tensile stress-strain properties" by using test pieces of No. 3 dumbbell made of the above-mentioned vulcanized rubber sheets for test, and elongation at break EB and strength at break TB of each of the vulcanized rubber sheets for test were measured. Values of the general formula (5) were calculated from the obtained measured values.

<Measurement of Rubber Hardness Hs>

A rubber hardness of each of the vulcanized rubber sheets for test were measured at 23° C. using a durometer type A in accordance with JIS K6253.

<Steering Stability Test>

Each of the test tires was loaded on all axles of a FF2000 cc vehicle of domestic production and in-vehicle running was conducted on a test course. Steering stability was evaluated by sensory evaluation of a driver immediately after start of and 30 minutes after start of zigzag test driving. Relative evaluation was conducted by comprehensively judging the above evaluation, assuming steering stability of Comparative Example 1 to be 100 points. The larger the point of steering stability is, the more superior it is.

<Test for Tire Durability>

Each of test tires was mounted on a rim of 15×6JJ of JIS standard, and the tire was run on a φ1,707 mm drum at a speed of 80 km/h at room temperature (38° C.) under the conditions of an air pressure of 150 kPa and a load of 6.96 kN. The driving was stopped when a damage of a tire such as cracking of a side wall occurred. A running distance until the damage occurred was measured, and tire durability was evaluated under the following evaluation criteria. The targeted level of performance is at least ○ level.

○: No damage of tire occurred even in a running distance of 30,000 kilometers or more.

Δ: Damage of tire occurred in a running distance of 10,000 kilometers or more and less than 30,000 kilometers.

x: Damage of tire occurred in a running distance of less than 10,000 kilometers.

<Test for Fuel Efficiency>

Each of the test tires was run using a rim (15×6JJ) at an inner pressure of 230 kPa at a load of 3.43 kN at a speed of 80 km/h, and rolling resistances thereof were measured with a rolling resistance tester. The rolling resistance is indicated by an index on the assumption that the rolling resistance of Comparative example 1 is 100. The larger the index is, the better the fuel efficiency is.

a strength at break TB (MPa) and an elongation at break EB (%) which are measured according to JIS K6251 satisfy the following general formulae (4) and (5)

$EB \geq 350$  General formula (4)

$TB \times EB \geq 8500.$  General formula (5)

TABLE 1

|  | Example | | | | Comparative Example | | |
| --- | --- | --- | --- | --- | --- | --- | --- |
|  | 1 | 2 | 3 | 4 | 1 | 2 | 3 |
| Compounding amount (part by mass) | | | | | | | |
| NR | 100 | — | 75 | — | 75 | 70 | 70 |
| HPNR 1 | — | 100 | — | — | — | — | — |
| HPNR 2 | — | — | — | 100 | — | — | — |
| BR1 | — | — | — | — | 25 | 30 | 30 |
| BR2 | — | — | 25 | — | — | — | — |
| Carbon black 1 | — | — | 35 | — | 70 | 60 | 13 |
| Carbon black 2 | 5 | 5 | — | 5 | — | — | — |
| Silica | 30 | 30 | — | 30 | — | — | — |
| Silane coupling agent | 3 | 3 | — | 3 | — | — | — |
| Oil | — | — | 2 | — | 20 | 10 | — |
| Antistatic agent | — | — | — | 10 | — | — | — |
| Wax | 1 | 1 | 1 | 1 | 1 | 1 | 1 |
| Anti-aging agent | 2 | 2 | 2 | 2 | 2 | 2 | 2 |
| Stearic acid | 2 | 2 | 2 | 2 | 2 | 2 | 2 |
| Zinc oxide | 2.5 | 2.5 | 2.5 | 2.5 | 2.5 | 2.5 | 2.5 |
| Sulfur | 2.5 | 2.5 | 2.5 | 2.5 | 2.5 | 2.5 | 2.5 |
| Vulcanization accelerator | 2.7 | 2.7 | 2.2 | 2.7 | 1.7 | 1.7 | 1.7 |
| Results of evaluation | | | | | | | |
| tan δ (General formula (3)) | 0.05 | 0.04 | 0.05 | 0.05 | 0.15 | 0.13 | 0.06 |
| E* (MPa) (General formula (2)) | 3.4 | 3.3 | 3.4 | 3.1 | 3.5 | 3.1 | 1.9 |
| TB (MPa) | 25 | 30 | 25 | 28 | 15 | 14 | 12 |
| EB (%) (General formula (4)) | 650 | 680 | 600 | 700 | 500 | 520 | 570 |
| (General formula (1)) | 68.0 | 82.5 | 68.0 | 62.0 | 23.3 | 23.8 | 31.7 |
| (General formula (5)) | 16250 | 20400 | 15000 | 19600 | 7500 | 7400 | 6900 |
| (General formula (6)) | 35 | 35 | 35 | 35 | 70 | 60 | 13 |
| (General formula (7)) | 0.26 | 0.26 | 0.36 | 0.26 | 0.73 | 0.63 | 0.14 |
| Hardness of rubber (Hs) | 51 | 52 | 53 | 50 | 57 | 56 | 40 |
| Steering stability | 100 | 100 | 100 | 100 | 100 | 98 | 82 |
| Durability of tire | ○ | ○ | ○ | ○ | ○ | ○ | x |
| Fuel efficiency | 112 | 114 | 112 | 112 | 100 | 102 | 108 |

From the results shown in Table 1, it is seen that the rubber compositions for a base tread of the present disclosure, in which a dynamic elastic modulus E* (MPa) and a loss tangent tan δ which were measured at a temperature of 70° C., an initial strain of 10% and a dynamic strain of 2% satisfy the specific general formulae, and a strength at break TB (MPa) and an elongation at break EB (%) which were measured according to JIS K6251 satisfy the specific general formulae, are excellent in steering stability and fuel efficiency while maintaining a strength.

The invention claimed is:

1. A pneumatic tire comprising a base tread made of a rubber composition for a base tread, wherein the rubber composition for the base tread has a dynamic elastic modulus E* (MPa) and a loss tangent tan δ which are measured at a temperature of 70° C., an initial strain of 10% and a dynamic strain of 2% and satisfies the following general formulae (1) to (3)

$E^*/\tan \delta \geq 25$  General formula (1)

$2.0 \leq E^* \leq 3.4$  General formula (2)

$\tan \delta \leq 0.08$, and  General formula (3)

2. The pneumatic tire comprising a base tread made of the rubber composition for a base tread of claim 1, wherein a rubber hardness Hs of the rubber composition measured at 23° C. in accordance with JIS K6253 Type A Method is not more than 62.

3. The pneumatic tire comprising a base tread made of the rubber composition for a base tread of claim 1, comprising m kinds (m is an integer of 1 or more) of carbon black and/or n kinds (n is an integer of 1 or more) of silica.

4. The pneumatic tire comprising a base tread made of the rubber composition for a base tread of claim 2, comprising m kinds (m is an integer of 1 or more) of carbon black and/or n kinds (n is an integer of 1 or more) of silica.

5. The pneumatic tire comprising a base tread made of the rubber composition for a base tread of claim 3, wherein a content and a nitrogen adsorption specific surface area of carbon black, and a content and a BET specific surface area of silica satisfy the following general formulae (6) and (7)

$15 \leq (W1+W2+ \ldots +Wm)+(Y1+Y2+ \ldots +Yn) \leq 65$  General formula (6)

$0.20 \leq (W1/X1+W2/X2+ \ldots +Wm/Xm)+(Y1/Z1+Y2/Z2+ \ldots +Yn/Zn) \leq 1.2$  General formula (7)

wherein in the general formulae,

W1, W2 Wm represent contents (part by mass) of the respective carbon black based on 100 parts by mass of rubber component, X1, X2 Xm represent nitrogen adsorption specific surface areas ($m^2/g$) of the respective carbon black, Y1, Y2 Yn represent contents (part by mass) of the respective silica based on 100 parts by mass of rubber component, and Z1, Z2 Zn represent BET specific surface areas ($m^2/g$) of the respective silica.

6. The pneumatic tire comprising a base tread made of the rubber composition for a base tread of claim 4, wherein a content and a nitrogen adsorption specific surface area of carbon black, and a content and a BET specific surface area of silica satisfy the following general formulae (6) and (7)

$$15 \leq (W1+W2+ +Wm)+(Y1+Y2+ +Yn) \leq 65 \quad \text{General formula (6)}$$

$$0.20 \leq (W1/X1+W2/X2+ +Wm/Xm)+(Y1/Z1+Y2/Z2+ +Yn/Zn) \leq 1.2 \quad \text{General formula (7)}$$

wherein in the general formulae,

W1, W2 Wm represent contents (part by mass) of the respective carbon black based on 100 parts by mass of rubber component, X1, X2 Xm represent nitrogen adsorption specific surface areas ($m^2/g$) of the respective carbon black, Y1, Y2 Yn represent contents (part by mass) of the respective silica based on 100 parts by mass of rubber component, and Z1, Z2 Zn represent BET specific surface areas ($m^2/g$) of the respective silica.

7. The pneumatic tire comprising a base tread made of the rubber composition for a base tread of claim 1, comprising a rubber component comprising a high purity natural rubber having a nitrogen content of not more than 0.20% by mass.

8. The pneumatic tire comprising a base tread made of the rubber composition for a base tread of claim 5, wherein General formula (7) is:

$$0.20 \leq (W1/X1+W2/X2+ +Wm/Xm)+(Y1/Z1+Y2/Z2+ +Yn/Zn) \leq 0.4. \quad \text{General formula (7)}$$

9. The pneumatic tire comprising a base tread made of the rubber composition for a base tread of claim 6, wherein General formula (7) is:

$$0.20 \leq (W1/X1+W2/X2+ +Wm/Xm)+(Y1/Z1+Y2/Z2+ +Yn/Zn) \leq 0.4. \quad \text{General formula (7)}$$

* * * * *